(12) United States Patent
Zhou et al.

(10) Patent No.: US 11,928,825 B2
(45) Date of Patent: Mar. 12, 2024

(54) UNSUPERVISED IMAGE SEGMENTATION METHOD AND ELECTRONIC DEVICE

(71) Applicant: Tsinghua University, Beijing (CN)

(72) Inventors: Yuezhi Zhou, Beijing (CN); Quanwei Huang, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 17/696,668

(22) Filed: Mar. 16, 2022

(65) Prior Publication Data

US 2022/0207752 A1    Jun. 30, 2022

Related U.S. Application Data

(63) Continuation of application No. PCT/CN2021/117515, filed on Sep. 9, 2021.

(30) Foreign Application Priority Data

Nov. 27, 2020   (CN) .......................... 202011353104.2

(51) Int. Cl.
*G06T 7/194* (2017.01)
*G06T 7/162* (2017.01)
(Continued)

(52) U.S. Cl.
CPC ............ *G06T 7/194* (2017.01); *G06T 3/4053* (2013.01); *G06T 7/162* (2017.01); *G06V 10/28* (2022.01);
(Continued)

(58) Field of Classification Search
CPC ....... G06T 7/194; G06T 3/4053; G06T 7/162; G06T 7/11; G06T 7/12;
(Continued)

(56) References Cited

FOREIGN PATENT DOCUMENTS

CN    112419344    2/2021

OTHER PUBLICATIONS

Zhang, W., Xiong, Q., Shi, W. and Chen, S., 2016. Region saliency detection via multi-feature on absorbing Markov chain. The Visual Computer, 32, pp. 275-287.*
(Continued)

*Primary Examiner* — Zhitong Chen
(74) *Attorney, Agent, or Firm* — Hodgson Russ LLP

(57) ABSTRACT

An unsupervised image segmentation method includes: performing a superpixel segmentation on an image containing a target object to acquire a plurality of superpixel sets, each superpixel set corresponding to a respective superpixel node; generating an undirected graph according to superpixel nodes; determining foreground superpixel nodes and background superpixel nodes in the undirected graph according to a first label set corresponding to the plurality of superpixel nodes; generating a minimization objective function according to the foreground superpixel nodes and the background superpixel nodes; segmenting the undirected graph according to the minimization objective function to acquire a foreground part and a background part and to generate a second label set; and performing an image segmentation on the image according to a comparison result of the first label set and the second label set.

18 Claims, 7 Drawing Sheets

(51) Int. Cl.
  *G06V 10/28* (2022.01)
  *G06V 10/50* (2022.01)
  *G06V 10/762* (2022.01)

(52) U.S. Cl.
  CPC ........ *G06V 10/507* (2022.01); *G06V 10/7635* (2022.01)

(58) Field of Classification Search
  CPC ........... G06T 2207/20072; G06T 2207/20132; G06V 10/28; G06V 10/507; G06V 10/7635; G06V 2201/03; G06V 10/26; G06V 10/426
  See application file for complete search history.

(56) References Cited

OTHER PUBLICATIONS

Liang, X., Shen, X., Feng, J., Lin, L. and Yan, S., 2016. Semantic object parsing with graph lstm. In Computer Vision—ECCV 2016: 14th European Conference, Amsterdam, the Netherlands, Oct. 11-14, 2016, Proceedings, Part I 14 (pp. 125-143). Springer International Publishing.*

Jiao, X., Chen, Y. and Dong, R., 2020. An unsupervised image segmentation method combining graph clustering and high-level feature representation. Neurocomputing, 409, pp. 83-92.*

Senthilkumaran, N. and Vaithegi, S., 2016. Image segmentation by using thresholding techniques for medical images. Computer Science & Engineering: An International Journal, 6(1), pp. 1-13.*

Zhang, W., Xiong, Q., Shi, W. and Chen, S., 2016. Region saliency detection via multi-feature on absorbing Markov chain. the Visual Computer, 32, pp. 275-287.*

Liang, X., Shen, X., Feng, J., Lin, L. and Yan, S., 2016. Semantic object parsing with graph lstm. InComputer Vision—ECCV 2016: 14th European Conference, Amsterdam, the Netherlands, Oct. 11-14, 2016, Proceedings, Part I 14 (pp. 125-143). Springer International Publishing.*

Jiao, X., Chen, Y. and Dong, R., 2020. An unsupervised image segmentation method combining graph clustering and high-level feature representation. Neurocomputing, 409, pp. 83-92.*

Senthilkumaran, N. and Vaithegi, S., 2016. Image segmentation by using thresholding techniques for medical images. Computer Science & Engineering: An International Journal, 6(1), pp. 1-13.*

WIPO, International Search Report and Written Opinion for International Application No. PCT/CN2021/117515, dated Nov. 25, 2021.

Huang et al., "A Chan-Vese Model Based on the Markov Chain for Unsupervised Medical Image Segmentation," Tsinghua Science and Technology, Dec. 2021, vol. 26, No. 6.

Gui et al., "Gradient-Constrained SLIC Based Fast Video Object Segmentation," Journal of Frontiers of Computer Science and Technology, 2019, vol. 13, No. 2.

Tang, "Research on Interactive Video object Extraction based on Gradient-Constrained SLIC Algorithm," Master's Thesis for Changsha University of Science & Technology, Oct. 2017.

* cited by examiner

UNSUPERVISED IMAGE SEGMENTATION METHOD AND ELECTRONIC DEVICE

CROSS-REFERENCE TO RELATED APPLICATIONS

This application is a continuation of International Application No. PCT/CN2021/117515, filed on Sep. 9, 2021, which claims priority to Chinese Patent Application Serial No. 202011353104.2, filed on Nov. 27, 2020, the entire contents of which are incorporated herein by reference.

FIELD

The present disclosure relates to a technical field of image segmentations, and particularly relates to an unsupervised image segmentation method, an electronic device and a non-transitory computer-readable storage medium.

BACKGROUND

Image segmentation belongs to computational vision technology, and is widely used in applications such as autonomous driving, face recognition, and image recognition. Nowadays, with developments of the precision medicine, quick and accurate acquisitions of segmentation results of medical targets such as tumors are helpful for surgical operators to carry out pre-operative plan, intra-operative guidance and post-operative evaluation. In general, accurate image segmentation can divide an image into multiple regions, where each region has a uniform color (or texture) and boundaries between each other are simple and accurate.

SUMMARY

In a first aspect, the present disclosure provides in embodiments an unsupervised image segmentation method. The method is applied in a terminal device including a processor, and includes: performing a superpixel segmentation on an image containing a target object to acquire a plurality of superpixel sets, each superpixel set corresponding to a respective superpixel node; generating an undirected graph according to a plurality of superpixel nodes corresponding to the plurality of superpixel sets, in which the undirected graph includes a first edge connected between two adjacent superpixel nodes, a foreground edge connected between a superpixel node and a virtual foreground node, and a background edge connected between a superpixel node and a virtual background node; determining foreground superpixel nodes and background superpixel nodes in the undirected graph according to a first label set corresponding to the plurality of superpixel nodes, the foreground superpixel node being a superpixel node belonging to a foreground of the image, and the background superpixel node being a superpixel node belonging to a background of the image; generating a minimization objective function according to the foreground superpixel nodes and the background superpixel nodes; segmenting the undirected graph according to the minimization objective function to acquire a foreground part and a background part and to generate a second label set; and performing an image segmentation on the image according to a comparison result of the first label set and the second label set.

In a second aspect, the present disclosure provides in embodiments an electronic device. The electronic device includes a processor; and a memory for storing instructions executable by the processor. The processor is configured to perform an unsupervised image segmentation method as described in any embodiment of the first aspect when executing the instructions.

In a third aspect, the present disclosure provides in embodiments a non-transitory computer-readable storage medium having stored therein computer programs that, when executed by a processor, causes the processor to perform an unsupervised image segmentation method as described in any embodiment of the first aspect.

Additional aspects and advantages of embodiments of present disclosure will be given in part in the following descriptions, become apparent in part from the following descriptions, or be learned from the practice of the embodiments of the present disclosure.

DETAILED DESCRIPTION

Figure 1:
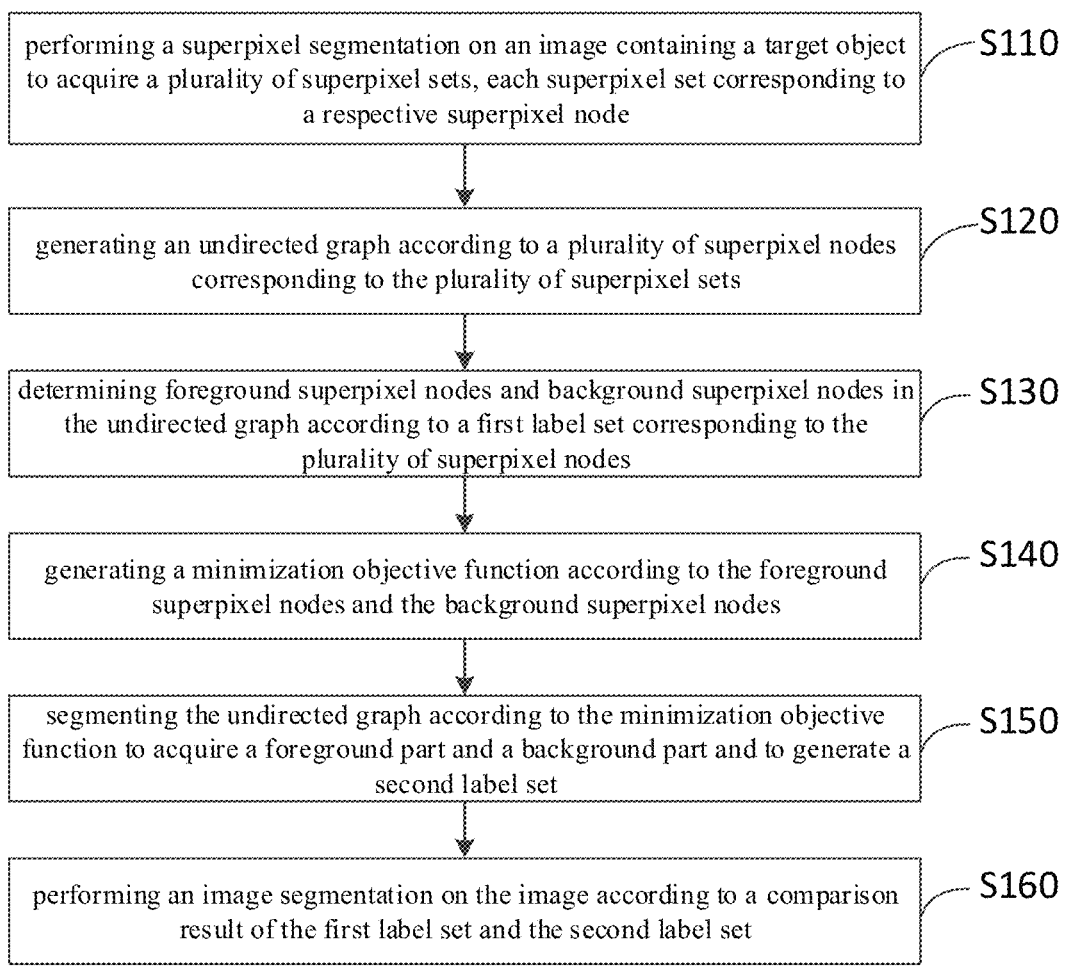
FIG. 1 is a flow chart of an unsupervised image segmentation method according to an embodiment of the present disclosure.

Embodiments of the present disclosure are described below with reference to the accompanying drawings, which include various details of the embodiments of the present disclosure to facilitate understanding and should be considered as illustrated. Accordingly, those ordinary skilled in the art will recognize that various changes and modifications of the embodiments described herein can be made without departing from the scope and spirit of the present disclosure. Also, descriptions of well-known functions and constructions are omitted from the following description for clarity and conciseness.

In the related art, objects that need to be separated in medical images are not as sharp as those in natural images, since most medical imaging techniques are based on computer imaging which is indirect image representation. For example, a computer tomography (CT) acquires a final image by utilization of a series of X-rays, and complex mathematical calculations. Compared with natural images that contain 3 channels of image information, most medical images are derived from single-channel, which makes the medical image provide very little information, and is not conducive to subsequent accurate segmentation.

In addition, in the medical image, the contrast between the target tissue and the background is small, especially when the noise near or at the boundary is large, making it challenging even for an experienced physician to perform the segmentation manually.

Existing deep learning segmentation algorithms usually require a large amount of annotated training data, and these training data require very experienced relevant personnel (such as doctors) to be labeled, which increases the time cost. In many medical sub-fields, it is difficult to have enough training data, which makes the deep segmentation network limited in the medical field.

Moreover, the deep segmentation network is generally performed from one terminal to another terminal, and its results are relatively fixed, which makes it impossible for users to manually improve or adjust the segmentation results.

Due to the difficulty of acquiring enough supervised samples in the medical field and the complexity of medical imaging, it will be difficult to achieve great progress in medical images with these supervised segmentation methods, which cannot meet the requirements of the precision medicine. Furthermore, even based on a large amount of annotated data, deep learning methods may still produce incorrect segmentations for some images. These incorrect segmentations are unacceptable in practical applications because they cannot be corrected.

Embodiments of the present disclosure seek to solve at least one of the problems existing in the related art to at least some extent.

Accordingly, the present disclosure provides an unsupervised image segmentation method, an electronic device and a non-transitory computer-readable storage medium. The method, electronic device and storage medium will be described in further details below with reference to the accompanying drawings.

FIG. 1 is a flow chart of an unsupervised image segmentation method according to an embodiment of the present disclosure. The unsupervised image segmentation method is performed by a terminal, e.g., a mobile terminal, such as a smart phone, a tablet computer, a laptop computer or a wearable device. In some embodiments, an executive body of the unsupervised image segmentation method is a processor.

As shown in FIG. 1, the unsupervised image segmentation method includes the following operations.

In block S110, a superpixel segmentation is performed by a processor on an image containing a target object to acquire a plurality of superpixel sets, each superpixel set corresponds to a respective superpixel node.

In block S120, an undirected graph is generated by the processor according to the superpixel nodes. The undirected graph includes a first edge connected between two adjacent superpixel nodes, a foreground edge connected between each superpixel node and a virtual foreground node, and a background edge connected between each superpixel node and a virtual background node.

In block S130, a foreground superpixel node and a background superpixel node in the undirected graph are determined by the processor according to a first label set corresponding to the plurality of superpixel nodes. The foreground superpixel node is a superpixel node belonging to a foreground of the image, and the background superpixel node is a superpixel node belonging to a background of the image.

In block S140, a minimization objective function is generated by the processor according to the foreground superpixel node and the background superpixel node.

In block S150, the undirected graph is segmented by the processor according to the minimization objective function to acquire a foreground part and a background part, and to generate a second label set.

In block S160, an image segmentation is performed by the processor on the image according to a comparison result of the first label set and the second label set.

With the method of the present disclosure, an image can be automatically and accurately segmented even in absence of annotated data, thereby acquiring the accurate image segmentation result. Compared with other unsupervised methods, the method of the present disclosure can accurately segment the desired target in a shorter time and with less manual intervention.

In some embodiments, generating the minimization objective function includes: determining a weight of the first edge, a weight of the foreground edge, a weight of the background edge of each superpixel node; and constructing the minimization objective function according to weights of the first, foreground and background edges of the plurality of superpixel nodes.

In some embodiments, the method further includes: determining the weight of the first edge between a first superpixel node and a second superpixel connected to the first superpixel node according to a grayscale of the first superpixel node and a grayscale of the second superpixel node.

In some embodiments, the method further includes: acquiring grayscales of all superpixels in the superpixel set corresponding to the respective superpixel node; and acquiring an average of the grayscales of all superpixels, and taking the average as a grayscale of the superpixel node.

In some embodiments, the method further includes: determining the weight of the foreground edge according to a grayscale of the virtual background node, a grayscale of the superpixel node, and a background weight difference; and determining the weight of the background edge according to a grayscale of the virtual foreground node, the grayscale of the superpixel node, and a foreground weight difference.

In some embodiments, the method further includes: acquiring an average of grayscales of the foreground superpixel nodes as the grayscale of the virtual foreground node; and acquiring an average of grayscales of the background superpixel nodes as the grayscale of the virtual background node.

In some embodiments, the method further includes: acquiring the foreground weight difference according to a normalized expected round-trip time matrix between two superpixel nodes, the grayscale of the superpixel node, and a grayscale of the foreground superpixel node; and acquiring the background weight difference according to the normalized expected round-trip time matrix between two superpixel nodes, the grayscale of the superpixel node, and a grayscale of the background superpixel node.

In some embodiments, determining the foreground superpixel nodes and the background superpixel nodes according to the first label set includes: arranging grayscales of the plurality of superpixel nodes in a descending order, determining a preset number of superpixel nodes in the front as the foreground superpixel nodes, and determining the remaining superpixel nodes as the background superpixel nodes.

In some embodiments, performing the superpixel segmentation on the image containing the target object includes: cropping the image to acquire a cropped image, the cropped image being a rectangular region acquired by extending a minimum rectangle containing the target object by a preset distance; and performing the superpixel segmentation on the cropped image.

In some embodiments, the method further includes: performing the image segmentation on the image according to the second label set being the same as the first label set; or determining updated foreground superpixel nodes and updated background superpixel nodes in the undirected graph according to the second label set being different from the first label set, constructing an updated objective function according to the updated foreground superpixel nodes and the updated background superpixel nodes, and segmenting the undirected graph according to the updated objective function to generate an updated label set until the updated label set is the same as a previous label set.

In some embodiments, a weight of a first edge of a superpixel node meets a formula of $$e_{ij} = G(|g_i - g_j|) + l_{ij}$$

where i represents a superpixel node i, j represents another superpixel node j connected to the superpixel node i, $e_{ij}$ represents a weight of a first edge connected between the superpixel nodes i and j, G(x) represents a Gaussian function, $l_{ij}$ represents a length of a common edge between superpixel sets corresponding to the superpixel nodes i and j, $g_i$ represents a grayscale of the superpixel node i, and $g_j$ represents a grayscale of the superpixel node j.

In some embodiments, a weight of a foreground edge of a superpixel node meets a formula of $$e_{si} = (g_i - g_t)^2 + c_{i1}$$

where i represents a superpixel node i, $e_{si}$ represents a weight of a foreground edge of the superpixel node i, $g_i$ represents a grayscale of the superpixel node i, $g_t$ represents a grayscale of the virtual background node, and $c_{i1}$ represents a background weight difference between the superpixel node i and the virtual background node.

In some embodiments, a weight of a background edge of a superpixel node meets a formula of $$e_{it} = (g_i - g_s)^2 + c_{i0}$$

where i represents a superpixel node i, $e_{it}$ represents a weight of a background edge of the superpixel node i, $g_i$ represents a grayscale of the superpixel node i, $g_s$ represents a grayscale of the virtual foreground node, and $c_{i0}$ represents a foreground weight difference between the superpixel node i and the virtual foreground node.

In some embodiments, the foreground weight difference has a formula of $$c_{i0} = \frac{\sum_{a_j=0} G(T_{ij})(g_i - g_j)^2}{\sum_{a_j=0} G(T_{ij})}$$

where i represents a superpixel node i, $c_{i0}$ represents a foreground weight difference between the superpixel node i and the virtual foreground node, $a_j=0$ indicates that a superpixel node j belongs to the foreground and is the foreground superpixel node, G(x) represents a Gaussian function, $T_{ij}$ represents an element of a normalized expected round-trip time matrix T between the superpixel nodes i and j, $g_i$ represents a grayscale of the superpixel node i, and $g_j$ represents a grayscale of the superpixel node j.

In some embodiments, the background weight difference has a formula of $$c_{i1} = \frac{\sum_{a_j=1} G(T_{ij})(g_i - g_j)^2}{\sum_{a_j=1} G(T_{ij})}$$

where i represents a superpixel node i, $c_{i1}$ represents a background weight difference between the superpixel node i and the virtual background node, $a_j=1$ indicates that a superpixel node j belongs to the background and is the background superpixel node, G(x) represents a Gaussian function, $T_{ij}$ represents an element of a normalized expected round-trip time matrix T between the superpixel nodes i and j, $g_i$ represents a grayscale of the superpixel node i, and $g_j$ represents a grayscale of the superpixel node j.

In some embodiments, the element $T_{ij}$ has a formula of $$T_{ij} = E_i(T_j) + E_j(T_i)$$

where $E_i(T_j)$ represents an expected time from the superpixel node i to the superpixel node j, in which when the superpixel nodes i and j are different, $E_i(T_j)=(Z_{jj}-Z_{ij})/\pi_j$, or when the superpixel nodes i and j are the same, the expected time from the superpixel node i to the superpixel node j is presented as $E_i(T_j)$, and $E_i(T_i)=1/\pi_i$, $Z_{jj}$ and $Z_{ij}$ represent elements of an intermediate matrix Z, $Z=(I-P+W)^{-1}$, I represents an identity matrix, P represents a transition matrix between the superpixel node i and the superpixel node j, W represents a construction matrix, where each row vector is equal to $\pi$, $\pi_i$ and $\pi_j$ represent elements of the construction matrix W, and $\pi_i = d_i/\Sigma_j d_j$, $d_i$ represents a degree of the superpixel node i, and $d_j$ represents a degree of the superpixel node j.

In some embodiments, a minimization objective function meets a formula of $$\sum_{a_j=1} e_{si} + \sum_{a_j=0} e_{it} + \mu \sum_{v_i, v_j \in V_s : a_i \neq a_j} e_{ij}$$

where $a_i$ represents a label of a superpixel node i, $a_j$ represents a label of a superpixel node j, $a_i=1$ indicates that the superpixel node i belongs to the background and is the background superpixel node, $a_i=0$ indicates that the superpixel node i belongs to the foreground and is the foreground superpixel node, $e_{si}$ represents a weight of a foreground edge of the superpixel node i, $e_{it}$ represents a weight of a background edge of the superpixel node i, $e_{ij}$ represents a weight of a first edge connecting the superpixel node i and the superpixel node j, $V_s$ represents a set of superpixel nodes, µ represents a weight factor, $v_i$ represents the superpixel node i, and $v_j$ represents the superpixel node j. In the present disclosure, a pixel-level segmentation is converted into a superpixel-level segmentation. By introducing superpixels, accurate boundaries are acquired, and the number of basic units for subsequent processes is reduced, resulting in a shortened processing time.

In the present disclosure, by converting the energy item of the Chan-Vese model into the weight of the edge of the undirected graph, the energy function of the Chan-Vese model can be directly solved by a maximum flow algorithm, and thus a fewer iterations are required for the final segmentation result compared with the other existing methods which utilize the gradient descent flow method.

In the present disclosure, the image to be segmented is pre-processed. The cropped image is acquired by selecting a relative small region from the whole image to be segmented. In this way, an influence of a large amount of background information unrelated to the target object on the subsequent segmentation is reduced, thus making the final segmentation result more accurate.

In the present disclosure, superpixels are used as segmentation units. Based on the similarity between the distance between the superpixels and the grayscale value, values are assigned to the edges of the undirected graph through the Markov chains, and the energy function of the Chan-Vese model is solved by the maximum flow algorithm, and the segmentation result is obtained. Therefore, the present method is simple, intuitive and efficient.

The method of the present disclosure is suitable for segmenting images with uneven intensity, for example, an image to be segmented containing an object with an unclear boundary. Therefore, the present method may be applied in medical images for the segmentation of organs, bones and lesions such as tumors. Moreover, the present method has no special requirements on the imaging mode of the images, and may be applied to medical images such as CT and MRI images.

Figure 2:
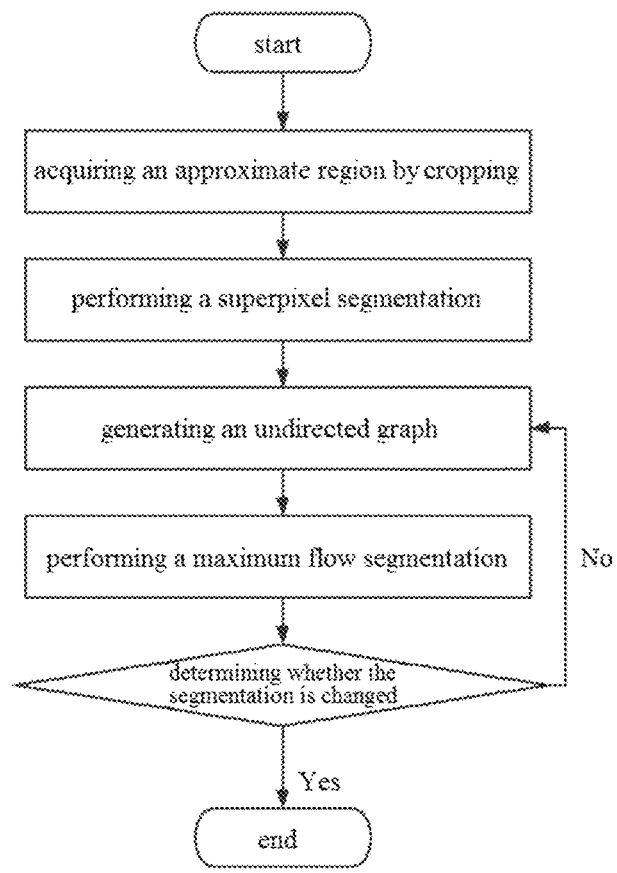
FIG. 2 is a flow chart of an image segmentation process according to an embodiment of the present disclosure.

As shown in FIG. 2, the unsupervised image segmentation method is based on the Chan-Vese model, and includes: acquiring an approximate region by cropping; performing a superpixel segmentation; generating an undirected graph; performing a maximum flow segmentation; determining whether the segmentation is changed; ending the process if the segmentation is not changed; returning to the operation of generating an undirected graph if the segmentation is changed.

The flow chart of the method shown in FIG. 2 will be described in detail as follows.

Acquiring the Approximate Region By Cropping

An original image to be segmented is acquired, and the original image is cropped to acquire a cropped image containing the target object.

It should be noted that in the present disclosure, there is no restriction on the original image. That is, any image can be used as the original image, for example, an image output by an image sensor or a processed image.

For most of the original images to be segmented, one or more target objects exist in one or more local regions in the original image, a cropping operation can be used to select an approximate region before the segmentation. The cropped image (i.e., the image acquired after the cropping) needs to retain the complete target object, but reduce the background region (that may cause interference in the subsequent processes) unrelated/irrelevant to the target object, thereby improving the accuracy of the segmentation.

Figure 3A:
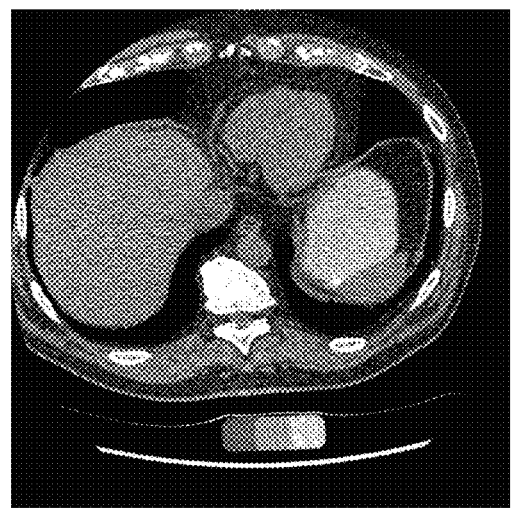
FIG. 3A is an original image according to an embodiment of the present disclosure.
Figure 3B:
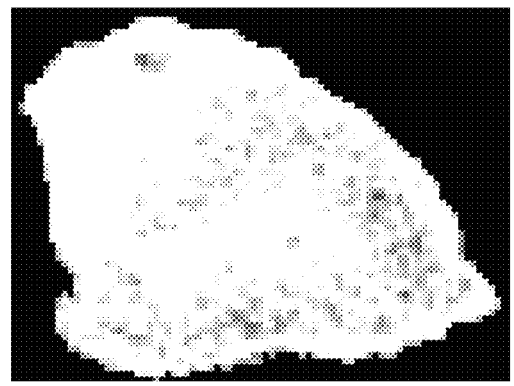
FIG. 3B is an image of a minimum rectangular region containing a target object according to an embodiment of the present disclosure.

For example, FIG. 3A shows an original image, which is a CT slice of a human lumbar part. A target object of the CT slice is a lumbar vertebra of the human body. As shown in FIG. 3B, by the cropping operation, an approximate region where the target object is located is extracted for subsequent processing, such as segmenting the target object.

Figure 3C:
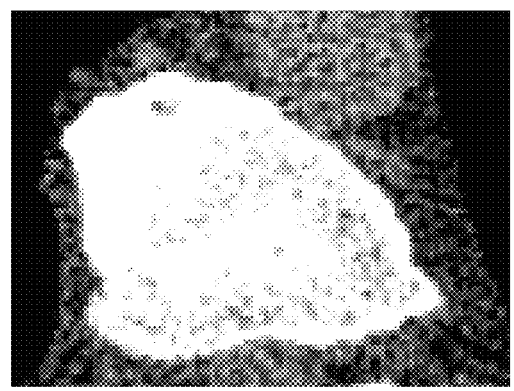
FIG. 3C is a cropped image according to an embodiment of the present disclosure.

In the present disclosure, the approximate region acquired by the cropping operation is a rectangular region acquired by extending a minimum rectangle containing the target object by a preset distance. For example, the minimum rectangle is extended by about 10 pixels in four directions (up, down, left, and right) to acquire the cropped image as shown in FIG. 3C.

After extracting the approximate region, the size of the image to be processed is reduced from 512×512 to 103×78, and a proportion of the background irrelevant to the target object is reduced by 97%. Therefore, the efficiency of subsequent processing the region where the target object is located is improved, and the segmentation result is improved.

Performing the Superpixel Segmentation

The superpixel segmentation is performed on the cropped image to acquire the corresponding superpixel segmentation result of the cropped image.

In some embodiments, a simple linear iterative clustering (SLIC) segmentation algorithm is used to perform the superpixel segmentation on the cropped image, resulting in a series of superpixel sets.

Superpixels in each superpixel set are spatially adjacent to each other, and they are similar in features such as color and texture. Different superpixel sets do not overlap with each other. The superpixels can provide accurate segmentation edges. Compared with the method using pixels as basic processing units, the superpixels can reduce the number of the processing units and thus processing time.

For a simple linear iterative clustering (SLIC) algorithm, an expected number of superpixel sets (K) is set. In the present disclosure, it is expected that each superpixel set contains 50 pixels, and K is about ⌈/50⌉, where ⌈•⌉ represents rounding up to an integer and N represents a total number of pixels in the cropped image. For example, if the size of the cropped image is 103×78, K can be (103×78)±50≈160.

Figure 4:
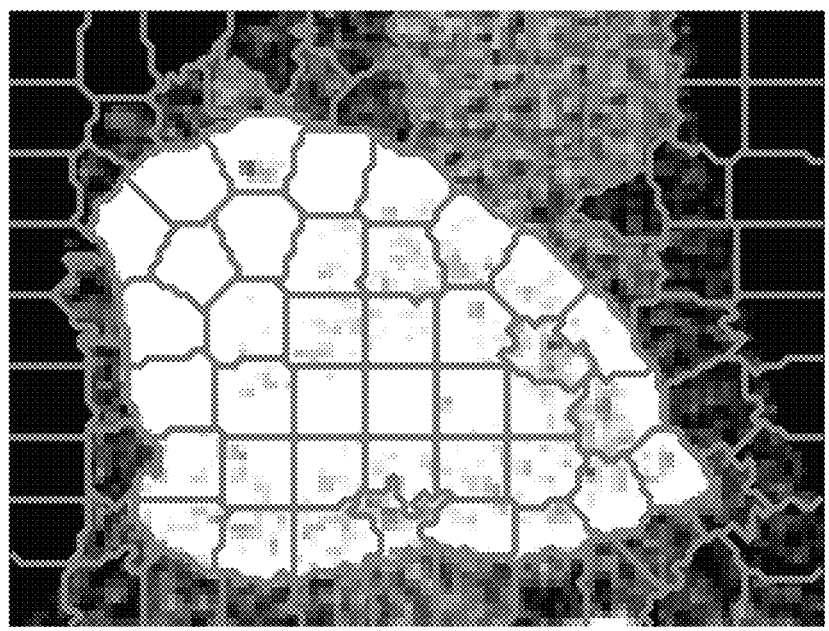
FIG. 4 is an image showing a result of superpixel segmentation according to an embodiment of the present disclosure.

By using the SLIC algorithm, a result of the superpixel segmentation may be acquired, which is shown in FIG. 4. Each frame (or subregion) in FIG. 4 represents a superpixel set. Since the number of the superpixel sets finally acquired by the SLIC algorithm is not strictly equal to the expected number K (the reason may be that superpixel centers initialized by the algorithm are uniformly sampled (that is, a difference between one initialized superpixel center and an adjacent superpixel center is the same), and the algorithm may involve combination of the superpixels), in the subsequent processing, K represents the number of the superpixel sets acquired by the superpixel segmentation.

In the present disclosure, the pixel-level segmentation is converted into the superpixel-level segmentation. Since the boundaries among the superpixels are accurate and the superpixels are spatially consistent, the edges acquired are more accurate than those acquired by the segmentation with pixels. In addition, the use of the superpixels can significantly reduce the number of basic units for subsequent processes, resulting in a shortened processing time.

Generating the Undirected Graph

In an operation (1), the undirected graph is generated according to the result of the superpixel segmentation.

Figure 5:
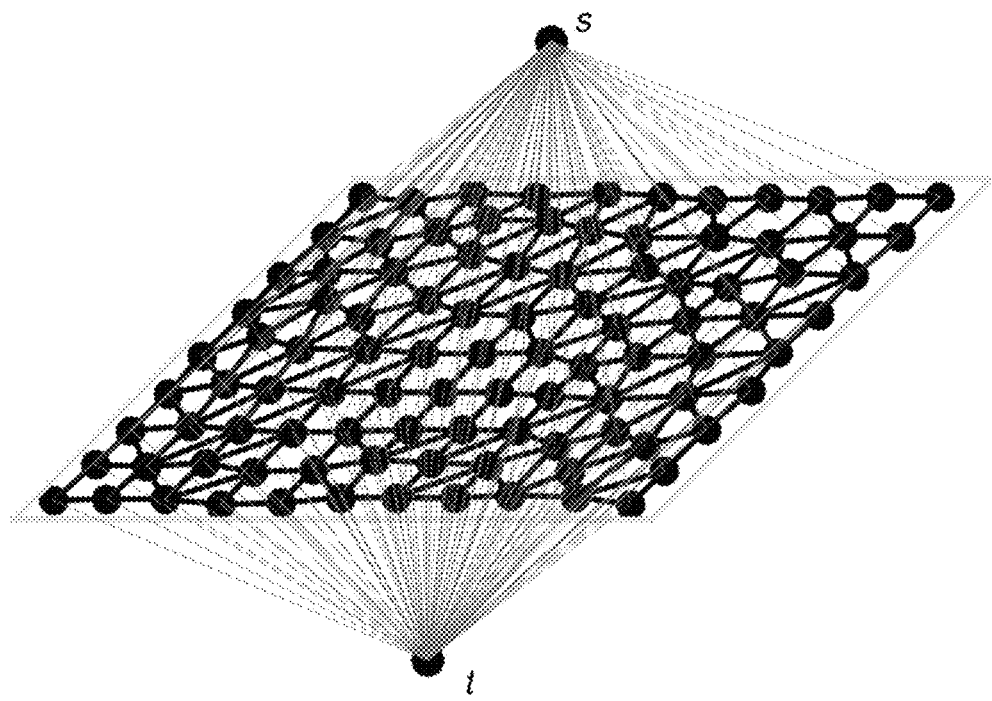
FIG. 5 is a schematic diagram of an undirected graph according to an embodiment of the present disclosure.

In the present disclosure, G=(V, E) represents the undirected graph, where V represents a set of all nodes in the undirected graph, and E represents a set of all edges in the undirected graph. FIG. 5 shows the undirected graph generated in the present disclosure.

The undirected graph contains (K+2) nodes in total, the K superpixel nodes correspond to K superpixel sets, respectively, and the two additional nodes are a virtual foreground node s and a virtual background node t. The set of the K superpixel nodes is denoted as $V_s$.

If the superpixel set corresponding to one superpixel node is adjacent to another superpixel set corresponding to one superpixel node in the superpixel segmentation result, an edge (i.e., a first edge) connecting the two nodes can be established in the undirected graph. For example, for nodes i, j∈$V_s$, their corresponding superpixel sets are adjacent in the cropped image, and thus an edge is formed between nodes i and j. The set of all edges each between two superpixel nodes corresponding to two adjacent superpixel sets is denoted as $E_1$. A length $l_{ij}$ of a common edge of any two adjacent superpixel sets is determined, and the length of the common edge refers to an average value of the numbers of adjacent pixels in the two adjacent superpixel sets in the cropped image. For example, a superpixel set corresponding to node i is adjacent to a superpixel set corresponding to node j, m pixels in the superpixel set corresponding to node i are adjacent to the superpixel set corresponding to node j, and n pixels in the superpixel set corresponding to node j are adjacent to the superpixel set corresponding to node i. In this case, $l_{ij}=(m+n)/2$.

Each node belonging to $V_s$ is connected to the virtual foreground node s and the virtual background node t respectively. A set of all edges (i.e., foreground edges) connecting to the virtual foreground node s and edges (i.e., background edges) connecting to the virtual background node t is denoted as $E_2$. The virtual foreground node s and the virtual background node t are not connected to each other.

In the present disclosure, each superpixel node is initially connected to the virtual foreground node and the virtual background node. During initialization, each edge is assigned a value, and some edges in the set $E_2$ may be broken during subsequent processes (such as performing the maximum flow segmentation). Therefore, a corresponding segmentation result is acquired according to a situation in which the edge(s) is broken.

In an operation (2), each edge is assigned a value according to the relationship between nodes in the undirected graph, including the following operations.

In an operation (2-1), for each edge belonging to $E_1$, a weight of each edge (i.e., a weight of the first edge) is determined.

In the present disclosure, a weight of an edge belonging to $E_1$ is:

$$e_{ij} = G(|g_i - g_j|) + l_{ij}$$

where i, j represent two superpixel nodes connected by the edge, G(x) represents a Gaussian function, $l_{ij}$ represents a length of a common edge between the superpixel nodes i and j, and $g_i$ represents a grayscale of the superpixel node i. In an embodiment, a value of $g_i$ is equal to an average of grayscales of all superpixels in the superpixel set corresponding to node i.

Each edge in $E_1$ will not change according to the subsequent segmentation result, because the weight of each edge only needs to be calculated once. The weight reflects the similarity between two adjacent superpixel nodes, and the larger the weight is, the more similar the two nodes are.

In an operation (2-2), it is determined whether each superpixel node belongs to foreground or background.

In the present disclosure, all superpixel nodes are initialized to indicate whether the node belongs to the foreground (e.g., the target object) or the background. In some embodiments, a label of a superpixel node is used to indicate whether the superpixel node belongs to the foreground or the background. For example, when the superpixel node i has a label of $a_i=0$, it indicates that the superpixel node i belongs to the foreground and the node i is a foreground superpixel node. When the superpixel node i has a label of $a_i=1$, it indicates that the superpixel node i belongs to the background and the node i is a background superpixel node.

In the present disclosure, all superpixel nodes are arranged in descending order according to their grayscales. After ranking, 30% of the nodes in the front are initialized to belong to the foreground. That is, the label of these nodes is set to 0, and the other superpixel nodes are initialized to belong to the background, that is, the label of these nodes is set to 1. A result of the initialization of all superpixel nodes is denoted as $A_0=(a_1, a_2, \ldots, a_K)$, and $A_0$ represents a current label set of all superpixel nodes.

In operation (2-3), for each edge belonging to $E_2$, a weight of each edge is determined.

In the present disclosure, a weight of an edge in $E_2$ reflects the similarity between a corresponding superpixel node and the virtual foreground node or the virtual background node. The larger the weight is, the more similar the superpixel node is to the virtual foreground node or the virtual background node.

In some embodiments, a current weight of an edge connected between a superpixel node i and the virtual foreground node s (i.e., a weight of a foreground edge) meets a formula of $$e_{si} = (g_i - g_t)^2 + c_{i1}$$

where $g_i$ represents a grayscale of the superpixel node i, for example, a value of $g_i$ is equal to an average of grayscales of all superpixels in the superpixel set corresponding to node i; $g_t$ represents a current grayscale of the virtual background node, for example, a value of $g_t$ is equal to an average of grayscales of all superpixels belonging to the background (i.e., all the nodes having $a_i$ of 1); and $c_{i1}$ represents a weight difference between the superpixel node i and the current virtual background node belong to the background (the weight here is a Gaussian function value corresponding to an expected round-trip time between nodes in the subsequent processes (such as operation (2-4)), and is referred as a background weight difference.

In some embodiments, a current weight of an edge connected between a superpixel node i and the virtual background node t (i.e., a weight of a background edge) meets a formula of $$e_{it} = (g_i - g_s)^2 + c_{i0}$$

where $g_s$ represents a current grayscale of the virtual foreground node, for example, a value of $g_s$ is equal to an average of grayscales of all superpixels belonging to the foreground (i.e., all the nodes having $a_i$ of 0); and $c_{i0}$ represents a weight difference between the superpixel node i and the current virtual foreground node belong to the foreground, and is referred as a foreground weight difference.

In operation (2-4), for each superpixel node belonging to $V_s$, the corresponding weight differences are acquired.

For example, for each superpixel node belonging to $V_s$, by using the Markov chain, a transition matrix $P_{K \times K}$ between adjacent superpixel nodes is acquired, thereby acquiring the background weight difference $c_{i1}$ and the foreground weight difference $c_{i0}$. An element in the transition matrix $P_{K \times K}$ is represented as $p_{ij}=w_{ij}/d_i$, where $w_{ij}=G(|g_i-j_j|)$, $d_i$ represents a degree of the superpixel node i, for example, a value of $d_i$ is equal to a sum of $w_{ij}$ between the superpixel node i and all the superpixel nodes j connected to the superpixel node i.

According to the nature of the Markov chain, the Markov chain converges to a distribution of $\pi_i=d_i/\Sigma_j d_j$, where $\pi_i$ represents a stable distribution probability of the superpixel node i. In some embodiments, the expected round-trip time between superpixel nodes is acquired according to a matrix of $Z=(I-P+W)^{-1}$, where each row vector of $W_{K \times K}$ is equal to $\pi$, $I_{K \times K}$ represents an identity matrix. For the expected round-trip time, information of the distance between nodes and the grayscale is considered. The smaller the value of the expected round-trip time is, the more similar the two nodes are.

When the nodes i and j are different superpixel nodes, the expected time from the node i to the node j is of $E_i(T_j)=(Z_{ij}-Z_{ij})/\pi_j$. When the nodes i and j are the same, the expected time of the node i is of $E_i(T_i)=1/\pi_i$.

The expected round-trip time between the two nodes is represented as $$T_{ij} = E_i(T_j) + E_j(T_i)$$

and an expected time matrix T is acquired by normalizing the expected time matrix formed by the element $T_{ij}$. The background weight difference $c_{i1}$ and the foreground weight difference $c_{i0}$ are acquired according to the normalized expected time matrix T, and are of the following formulas:

$$c_{i0} = \frac{\sum_{a_j=0} G(T_{ij})(g_i - g_j)^2}{\sum_{a_j=0} G(T_{ij})}$$

$$c_{i1} = \frac{\sum_{a_j=1} G(T_{ij})(g_i - g_j)^2}{\sum_{a_j=1} G(T_{ij})}$$

where $a_j=0$ indicates that the superpixel node j belongs to the foreground, and $a_j=1$ indicates that the superpixel node j belongs to the background, $c_{i1}$ represents a weight difference between the superpixel node i and the current virtual background node belong to the background, and $c_{i0}$ represents a weight difference between the superpixel node i and the current virtual foreground node belong to the foreground.

In some embodiments, the normalized expected time matrix T is of $$T = \begin{bmatrix} 0 & 0.04069 & 0.23057 & \ldots & 1 \\ 0.15582 & 0 & \ldots & \ldots & \ldots \\ 0.33543 & \ldots & 0 & \ldots & \ldots \\ \ldots & \ldots & \ldots & 0 & 0.89718 \\ 0.95267 & \ldots & \ldots & 0.77725 & 0 \end{bmatrix}.$$

In operation (3), a label set of all superpixel nodes updated is acquired according to the weight of every edge in the undirected graph.

A minimization objective function is set as a formula of $$\sum_{a_i=1} e_{si} + \sum_{a_i=0} e_{it} + \mu \sum_{v_i, v_j \in V_s : a_i \neq a_j} e_{ij}$$

where $\mu$ represents a weight factor, $v_i$ represents the superpixel node i (which is interchangeable with i), and $v_j$ represents the superpixel node j (which is interchangeable with j). In some embodiments of the present disclosure, $\mu$ is in a range of 0.001 to 0.1, for example, $\mu$ is 0.01. The weight factor $\mu$ is used to adjust a weight relationship between the first two items and the last item in the above objective function.

The minimum value of the above objective function can be solved by segmenting the undirected graph with the maximum flow. By segmenting the undirected graph acquired in the operation of generating the undirected graph by the maximum flow segmentation, a foreground part and a background part are acquired. The superpixel nodes in the foreground part are connected with the virtual foreground node s, and the superpixel nodes in the background part are connected with the virtual background node t, and the foreground part and the background part are not connected to each other.

According to the result of the maximum flow segmentation, the superpixel nodes connected to the virtual foreground node s are classified as belonging to the foreground, that is, the labels of these superpixel nodes are updated to be 0, and the superpixel nodes connected to the virtual background node t are classified as belonging to the background, that is, the labels of these superpixel nodes are updated to be 1. After updating the labels of all superpixel nodes, $A_1$ represents an updated label set composed of all $a_i$.

Figure 6A:
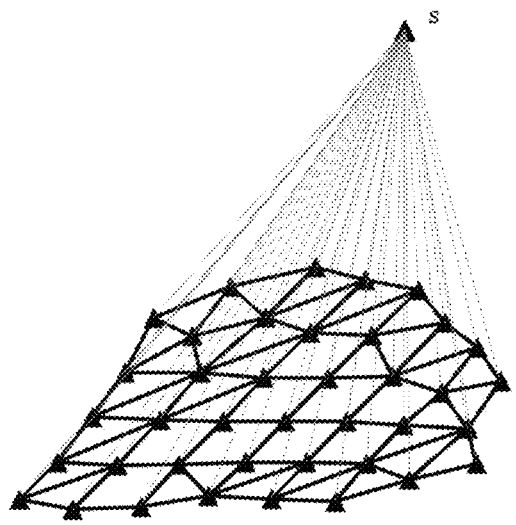
FIG. 6A is a schematic diagram of a foreground part acquired by segmenting an undirected graph according to an embodiment of the present disclosure.
Figure 6B:
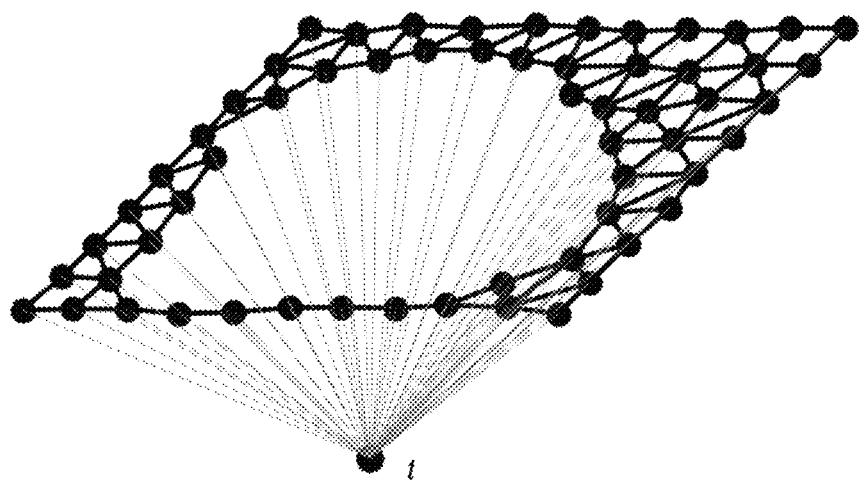
FIG. 6B is a schematic diagram of a background part acquired by segmenting an undirected graph according to an embodiment of the present disclosure.

For example, the result of segmenting the undirected graph into the foreground and background parts by the maximum flow segmentation in the present disclosure is shown in FIG. 6A and FIG. 6B. FIG. 6A shows the foreground part connected to the virtual foreground node s, and FIG. 6B shows the background part connected to the virtual background node t.

Determining Whether the Segmentation is Changed

It is determined whether the updated segmentation result ($A_1$) is the same as the segmentation result ($A_0$). If they are the same, a final segmentation result is acquired; if they are not the same, the segmentation result ($A_1$) is used as a new current label set, that is, $A_0$ is updated to be $A_1$, and the process is back to the operation (2-3) of determining the weight of each edge belonging to $E_2$. These operations are repeated until the updated segmentation result is the same as the last segmentation result, and the final segmentation result is acquired.

In the present disclosure, acquisition of the final segmentation result includes: according to the label of each superpixel node corresponding to the updated segmentation result $A_1$, marking all pixels in the superpixel set corresponding to the respective superpixel node with the label of $a_i$, to acquire a final pixel-level segmentation result.

In some embodiments, all the pixels belonging to the foreground are marked to acquire the final segmentation result. This segmentation result may be further adjusted slightly to acquire a more accurate segmentation.

Figure 7:
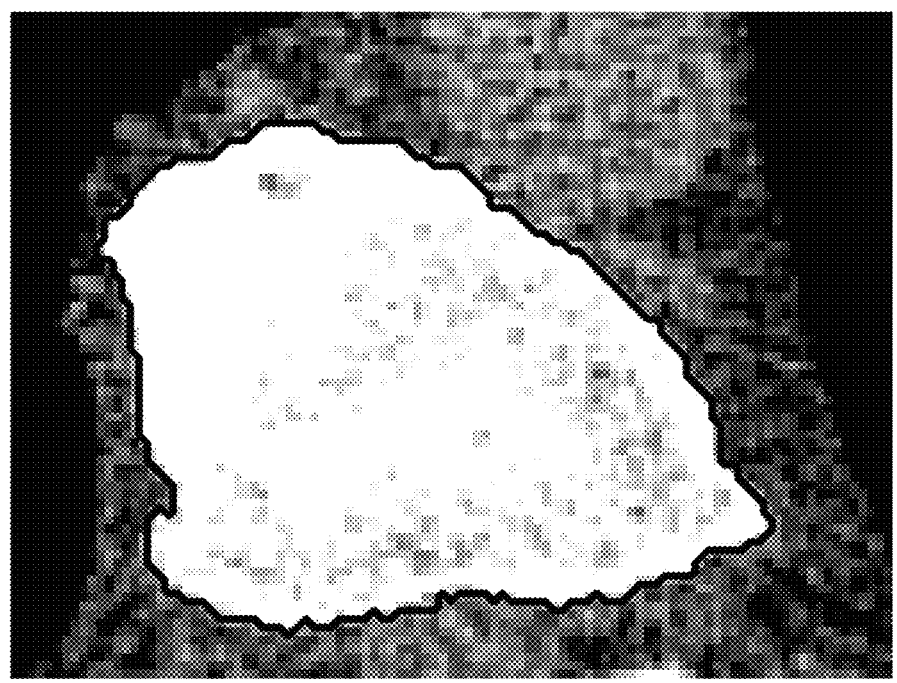
FIG. 7 is an image showing a final segmentation result acquired according to an embodiment of the present disclosure.

FIG. 7 shows a finally acquired segmentation result, and in the final segmentation result, a relative white region surrounded by a black outline is the segmented target object.

In the present disclosure, the original image is cropped, and the cropped image is subjected to the superpixel segmentation. The undirected graph is generated according to the superpixel segmentation result, and the energy term of the Chan-Vese model is represented by the weight of the edge. By using the Markov chain, the distance between superpixels and the grayscale of the superpixel can be considered in the process of assigning values to the edges. The final segmentation results can be acquired by repeatedly using the maximum flow segmentation and updating the weights of the edges. The method of the present disclosure can automatically and accurately segment an image in the medical field in a case of lacking annotated data, thereby providing accurate information for segmenting objects for medical applications and researches. With the present method, the desired target can be segmented in a shorter time and with less manual intervention.

The present disclosure further provides in embodiments an electronic device including a memory and a processor. The memory stores instructions executable by the processor. The processor is configured to perform the unsupervised image segmentation method as described in any above embodiment when executing the instructions.

The present disclosure further provides in embodiments a non-transitory computer-readable storage medium having stored therein computer programs that, when executed by a processor, causes the processor to perform the unsupervised image segmentation method as described in any above embodiment.

Regarding the electronic device and the non-transitory computer-readable storage medium in the above-mentioned embodiments, the specific manners in which each element performs operations have been described in detail in the embodiments of the method, and thus will not be described here again.

Figure 8:
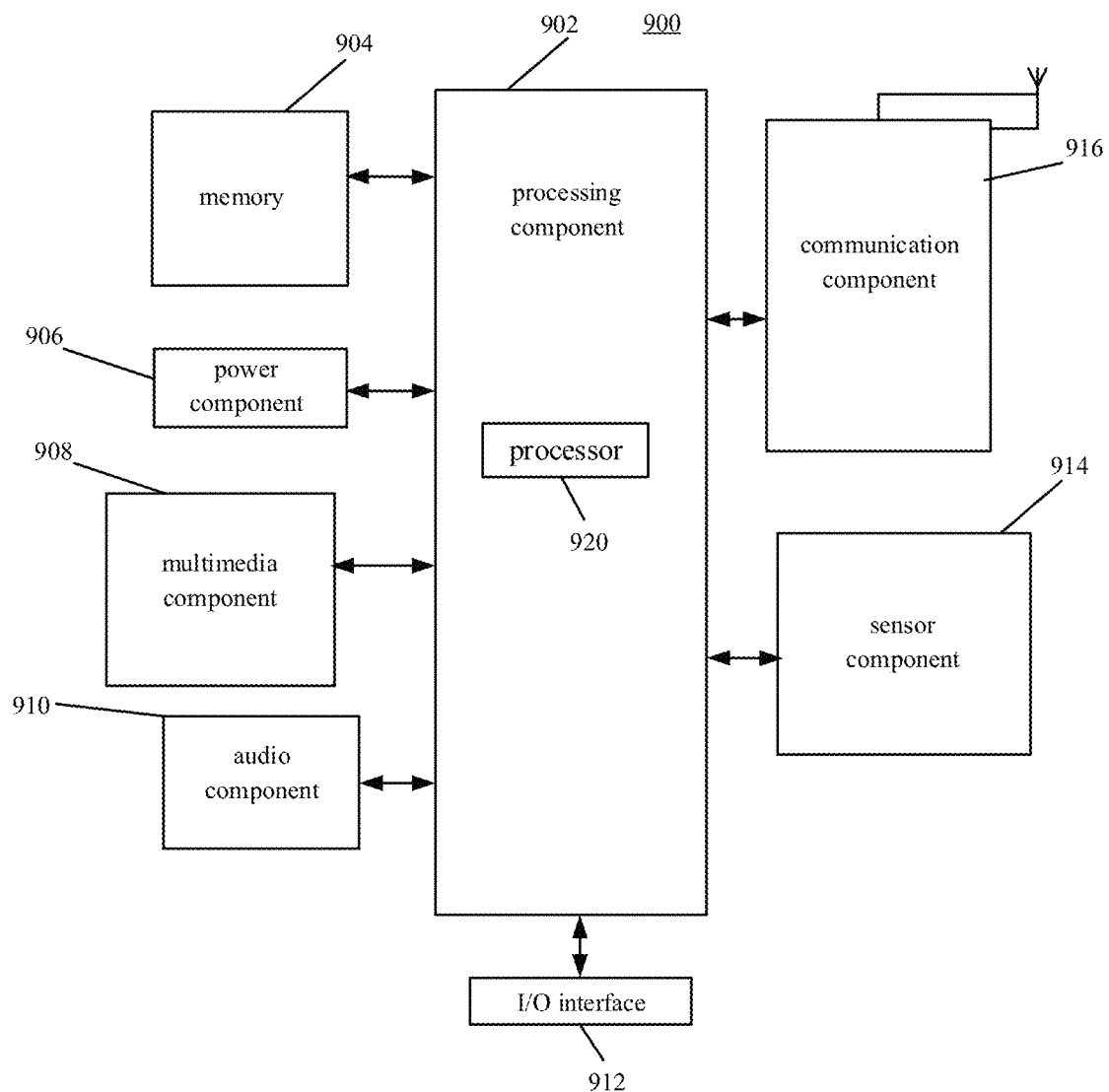
FIG. 8 is a block diagram of an electronic device according to an embodiment of the present disclosure.

FIG. 8 is a block diagram showing an electronic device according to an embodiment. For example, the electronic device 900 may be a mobile phone, a computer, a digital broadcasting terminal, a messaging device, a game console, a tablet device, a medical device, an exercise equipment, a personal digital assistant, and the like.

Referring to FIG. 8, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, 3G, 4G, 5G or a combination thereof. In one embodiment, the communication component 916 receives a broadcast signal or broadcast associated information from an external broadcast management system via a broadcast channel. In one embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

The example of the present disclosure also provides a non-transitory computer-readable storage medium, when the instructions in the storage medium are executed by a processor of the mobile terminal, such that the mobile terminal can execute the method provided in any of the foregoing embodiments.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. An unsupervised image segmentation method, applied in a terminal device comprising a processor, the method comprising:
   performing a superpixel segmentation on an image containing a target object to acquire a plurality of superpixel sets, each superpixel set corresponding to a respective superpixel node;
   generating an undirected graph according to a plurality of superpixel nodes corresponding to the plurality of superpixel sets, wherein the undirected graph comprises a first edge connected between two adjacent superpixel nodes, a foreground edge connected between a superpixel node and a virtual foreground node, and a background edge connected between a superpixel node and a virtual background node;
   determining foreground superpixel nodes and background superpixel nodes in the undirected graph according to a first label set corresponding to the plurality of superpixel nodes, the foreground superpixel node being a superpixel node belonging to a foreground of the image, and the background superpixel node being a superpixel node belonging to a background of the image;
   generating a minimization objective function according to the foreground superpixel nodes and the background superpixel nodes;
   segmenting the undirected graph according to the minimization objective function to acquire a foreground part and a background part and to generate a second label set; and
   performing an image segmentation on the image according to a comparison result of the first label set and the second label set;
   wherein generating the minimization objective function comprises:
      determining a weight of the first edge, a weight of the foreground edge, a weight of the background edge of each superpixel node; and
      constructing the minimization objective function according to weights of the first, foreground and background edges of the plurality of superpixel nodes;
   wherein the method further comprises:
      determining the weight of the foreground edge according to a grayscale of the virtual background node, a grayscale of the superpixel node, and a background weight difference; and
      determining the weight of the background edge according to a grayscale of the virtual foreground node, the grayscale of the superpixel node, and a foreground weight difference.

2. The method according to claim 1, further comprising:
   determining the weight of the first edge between a first superpixel node and a second superpixel connected to the first superpixel node according to a grayscale of the first superpixel node and a grayscale of the second superpixel node.

3. The method according to claim 2, further comprising:
   acquiring grayscales of all superpixels in the superpixel set corresponding to the respective superpixel node; and
   acquiring an average of the grayscales of all superpixels, and taking the average as a grayscale of the superpixel node.

4. The method according to claim 1, further comprising:
acquiring an average of grayscales of the foreground superpixel nodes as the grayscale of the virtual foreground node; and
acquiring an average of grayscales of the background superpixel nodes as the grayscale of the virtual background node.

5. The method according to claim 1, further comprising:
acquiring the foreground weight difference according to a normalized expected round-trip time matrix between two superpixel nodes, the grayscale of the superpixel node, and a grayscale of the foreground superpixel node; and
acquiring the background weight difference according to the normalized expected round-trip time matrix between two superpixel nodes, the grayscale of the superpixel node, and a grayscale of the background superpixel node.

6. The method according to claim 1, wherein determining the foreground superpixel nodes and the background superpixel nodes according to the first label set comprises:
arranging grayscales of the plurality of superpixel nodes in a descending order, determining a preset number of superpixel nodes in front as the foreground superpixel nodes, and determining remaining superpixel nodes as the background superpixel nodes.

7. The method according to claim 1, wherein performing the superpixel segmentation on the image containing the target object comprises:
cropping the image to acquire a cropped image, the cropped image being a rectangular region acquired by extending a minimum rectangle containing the target object by a preset distance; and
performing the superpixel segmentation on the cropped image.

8. The method according to claim 1, further comprising:
performing the image segmentation on the image according to the second label set being the same as the first label set; or
determining updated foreground superpixel nodes and updated background superpixel nodes in the undirected graph according to the second label set being different from the first label set, constructing an updated objective function according to the updated foreground superpixel nodes and the updated background superpixel nodes, and segmenting the undirected graph according to the updated objective function to generate an updated label set until the updated label set is the same as a previous label set.

9. The method according to claim 1, wherein a weight of a first edge of a superpixel node meets a formula of:

$$e_{ij}=G(|g_i-g_j|)+l_{ij}$$

where i represents a superpixel node i, j represents another superpixel node j connected to the superpixel node i, $e_{ij}$ represents a weight of a first edge connected between the superpixel nodes i and j, G(x) represents a Gaussian function, $l_{ij}$ represents a length of a common edge between superpixel sets corresponding to the superpixel nodes i and j, $g_i$ represents a grayscale of the superpixel node i, and $g_j$ represents a grayscale of the superpixel node j.

10. The method according to claim 1, wherein a weight of a foreground edge of a superpixel node meets a formula of:

$$e_{si}=(g_i-g_t)^2+c_{i1}$$

where i represents a superpixel node i, $e_{si}$ represents a weight of a foreground edge of the superpixel node i, $g_i$ represents a grayscale of the superpixel node i, $g_t$ represents a grayscale of the virtual background node, and $c_{i1}$ represents a background weight difference between the superpixel node i and the virtual background node.

11. The method according to claim 1, wherein a weight of a background edge of a superpixel node meets a formula of:

$$e_{it}=(g_i-g_s)^2+c_{i0}$$

where i represents a superpixel node i, $e_{it}$ represents a weight of a background edge of the superpixel node i, $g_i$ represents a grayscale of the superpixel node i, $g_s$ represents a grayscale of the virtual foreground node, and $c_{i0}$ represents a foreground weight difference between the superpixel node i and the virtual foreground node.

12. The method according to claim 1, wherein the foreground weight difference has a formula of:

$$c_{i0}=\frac{\sum_{a_j=0}G(T_{ij})(g_i-g_j)^2}{\sum_{a_j=0}G(T_{ij})}$$

where i represents a superpixel node i, $c_{i0}$ represents a foreground weight difference between the superpixel node i and the virtual foreground node, $a_j=0$ indicates that a superpixel node j belongs to the foreground and is the foreground superpixel node, G(x) represents a Gaussian function, $T_{ij}$ represents an element of a normalized expected round-trip time matrix T between the superpixel nodes i and j, $g_i$ represents a grayscale of the superpixel node i, and $g_j$ represents a grayscale of the superpixel node j.

13. The method according to claim 1, wherein the background weight difference has a formula of:

$$c_{i1}=\frac{\sum_{a_j=1}G(T_{ij})(g_i-g_j)^2}{\sum_{a_j=1}G(T_{ij})}$$

where i represents a superpixel node i, $c_{i1}$ represents a background weight difference between the superpixel node i and the virtual background node, $a_j=1$ indicates that a superpixel node j belongs to the background and is the background superpixel node, G(x) represents a Gaussian function, $T_{ij}$ represents an element of a normalized expected round-trip time matrix T between the superpixel nodes i and j, $g_i$ represents a grayscale of the superpixel node i, and $g_j$ represents a grayscale of the superpixel node j.

14. The method according to claim 12, wherein the element $T_{ij}$ has a formula of:

$$T_{ij}=E_i(T_j)+E_j(T_i)$$

where $E_i(T_j)$ represents an expected time from the superpixel node i to the superpixel node j, wherein when the superpixel nodes i and j are different, $E_i(T_j)=(Z_{jj}-Z_{ij})/\pi_j$, or when the superpixel nodes i and j are the same, the expected time from the superpixel node i to the superpixel node j is presented as $E_i(T_j)$, and $E_i(T_i)=1/\pi_i$;

$Z_{ij}$ and $Z_{ij}$ represent elements of an intermediate matrix Z, $Z=(I-P+W)^{-1}$, I represents an identity matrix, P represents a transition matrix between the superpixel node i and the superpixel node j, W represents a construction matrix, where each row vector is equal to $\pi$, $\pi_i$ and $\pi_j$ represent elements of the construction matrix W, and $\pi_i = d_i/\Sigma_j d_j$, $d_i$ represents a degree of the superpixel node i, and $d_j$ represents a degree of the superpixel node j.

15. The method according to claim 13, wherein the element $T_{ij}$ has a formula of:

$$T_{ij} = E_i(T_j) + E_j(T_i)$$

where $E_i(T_j)$ represents an expected time from the superpixel node i to the superpixel node j, wherein when the superpixel nodes i and j are different, $E_i(T_j)=(Z_{jj}-Z_{ij})/\pi_j$, or when the superpixel nodes i and j are the same, the expected time from the superpixel node i to the superpixel node j is presented as $E_i(T_j)$, and $E_i(T_i)=1/\pi_i$, $Z_{ij}$ and $Z_{ij}$ represent elements of an intermediate matrix Z, $Z=(I-P+W)^{-1}$, I represents an identity matrix, P represents a transition matrix between the superpixel node i and the superpixel node j, W represents a construction matrix, where each row vector is equal to $\pi$, $\pi_i$ and $\pi_j$ represent elements of the construction matrix W, and $\pi_i = d_i/\Sigma_j d_j$, $d_i$ represents a degree of the superpixel node i, and $d_j$ represents a degree of the superpixel node j.

16. The method according to claim 1, wherein a minimization objective function meets a formula of:

$$\sum_{a_i=1} e_{si} + \sum_{a_i=0} e_{it} + \mu \sum_{v_i,v_j \in V_s; a_i \neq a_j} e_{ij}$$

where $a_i$ represents a label of a superpixel node i, $a_j$ represents a label of a superpixel node j, $a_i=1$ indicates that the superpixel node i belongs to the background and is the background superpixel node, $a_i=0$ indicates that the superpixel node i belongs to the foreground and is the foreground superpixel node, $e_{si}$ represents a weight of a foreground edge of the superpixel node i, $e_{si}$ represents a weight of a background edge of the superpixel node i, $e_{ij}$ represents a weight of a first edge connecting the superpixel node i and the superpixel node j, $V_s$ represents a set of superpixel nodes, $\mu$ represents a weight factor, $v_i$ represents the superpixel node i, and $v_j$ represents the superpixel node j.

17. An electronic device, comprising:

a processor; and a memory for storing instructions executable by the processor;

wherein the processor is configured to perform an unsupervised image segmentation method when executing the instructions, and the method comprising:

performing a superpixel segmentation on an image containing a target object to acquire a plurality of superpixel sets, each superpixel set corresponding to a respective superpixel node;

generating an undirected graph according to a plurality of superpixel nodes corresponding to the plurality of superpixel sets, wherein the undirected graph comprises a first edge connected between two adjacent superpixel nodes, a foreground edge connected between a superpixel node and a virtual foreground node, and a background edge connected between a superpixel node and a virtual background node;

determining foreground superpixel nodes and background superpixel nodes in the undirected graph according to a first label set corresponding to the plurality of superpixel nodes, the foreground superpixel node being a superpixel node belonging to a foreground of the image, and the background superpixel node being a superpixel node belonging to a background of the image;

generating a minimization objective function according to the foreground superpixel nodes and the background superpixel nodes;

segmenting the undirected graph according to the minimization objective function to acquire a foreground part and a background part and to generate a second label set; and performing an image segmentation on the image according to a comparison result of the first label set and the second label set;

wherein generating the minimization objective function comprises:

determining a weight of the first edge, a weight of the foreground edge, a weight of the background edge of each superpixel node; and constructing the minimization objective function according to weights of the first, foreground and background edges of the plurality of superpixel nodes;

wherein the method further comprises:

determining the weight of the foreground edge according to a grayscale of the virtual background node, a grayscale of the superpixel node, and a background weight difference; and determining the weight of the background edge according to a grayscale of the virtual foreground node, the grayscale of the superpixel node, and a foreground weight difference.

18. A non-transitory computer-readable storage medium having stored therein computer programs that, when executed by a processor, causes the processor to perform an unsupervised image segmentation method, wherein the method comprises:

performing a superpixel segmentation on an image containing a target object to acquire a plurality of superpixel sets, each superpixel set corresponding to a respective superpixel node;

generating an undirected graph according to a plurality of superpixel nodes corresponding to the plurality of superpixel sets, wherein the undirected graph comprises a first edge connected between two adjacent superpixel nodes, a foreground edge connected between a superpixel node and a virtual foreground node, and a background edge connected between a superpixel node and a virtual background node;

determining foreground superpixel nodes and background superpixel nodes in the undirected graph according to a first label set corresponding to the plurality of superpixel nodes, the foreground superpixel node being a superpixel node belonging to a foreground of the image, and the background superpixel node being a superpixel node belonging to a background of the image;

generating a minimization objective function according to the foreground superpixel nodes and the background superpixel nodes;

segmenting the undirected graph according to the minimization objective function to acquire a foreground part and a background part and to generate a second label set; and performing an image segmentation on the image according to a comparison result of the first label set and the second label set;

wherein generating the minimization objective function comprises:

determining a weight of the first edge, a weight of the foreground edge, a weight of the background edge of each superpixel node; and constructing the minimization objective function according to weights of the first, foreground and background edges of the plurality of superpixel nodes;

wherein the method further comprises:

determining the weight of the foreground edge according to a grayscale of the virtual background node, a grayscale of the superpixel node, and a background weight difference; and determining the weight of the background edge according to a grayscale of the virtual foreground node, the grayscale of the superpixel node, and a foreground weight difference.

\* \* \* \* \*